Patented Aug. 12, 1924.

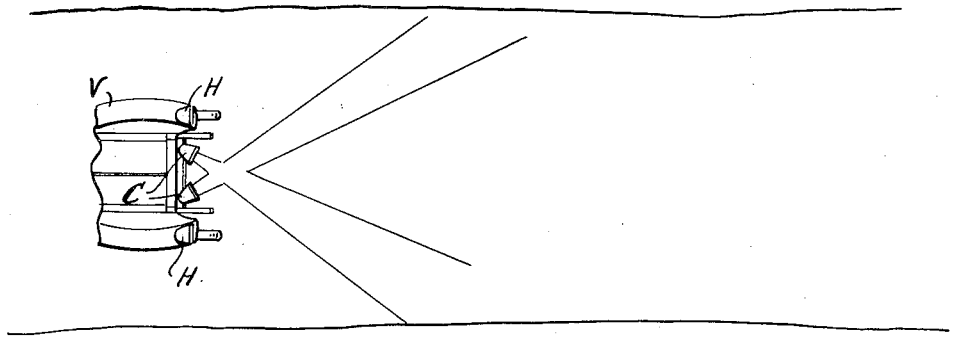
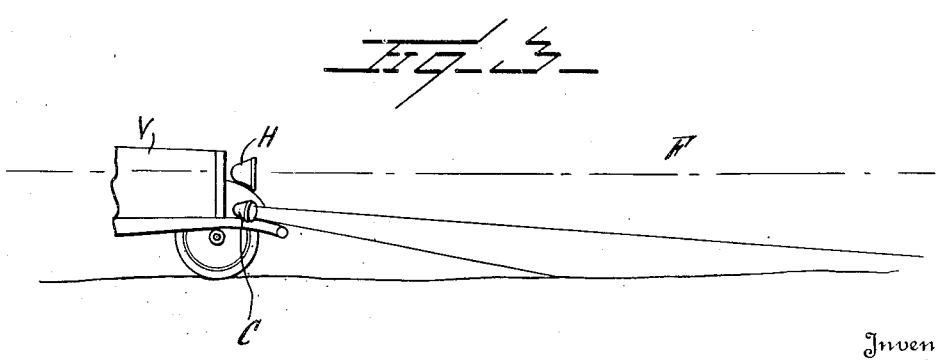

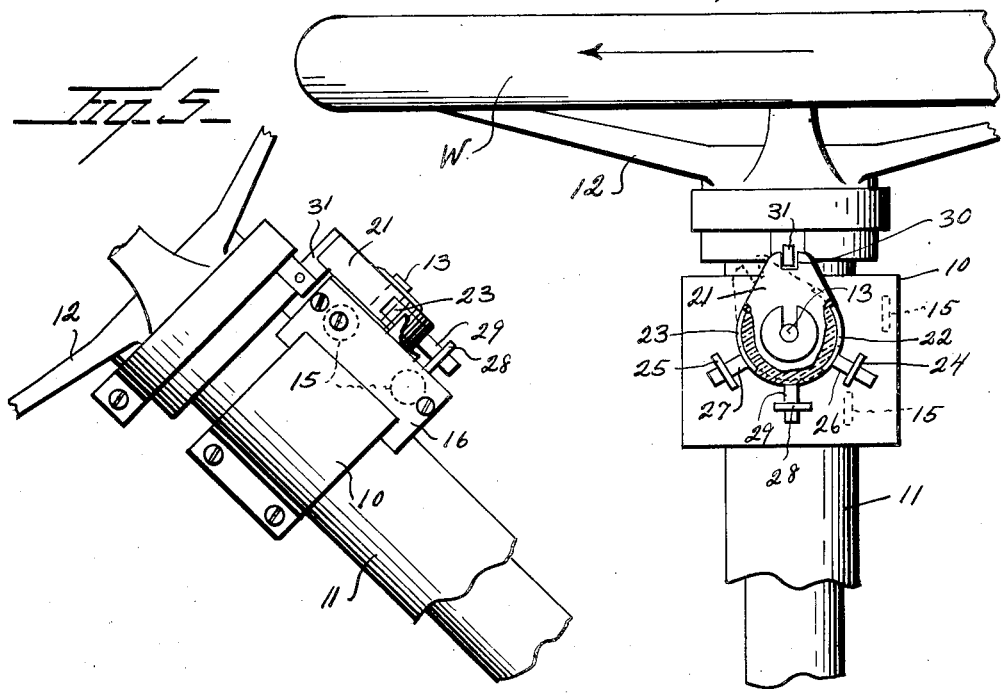
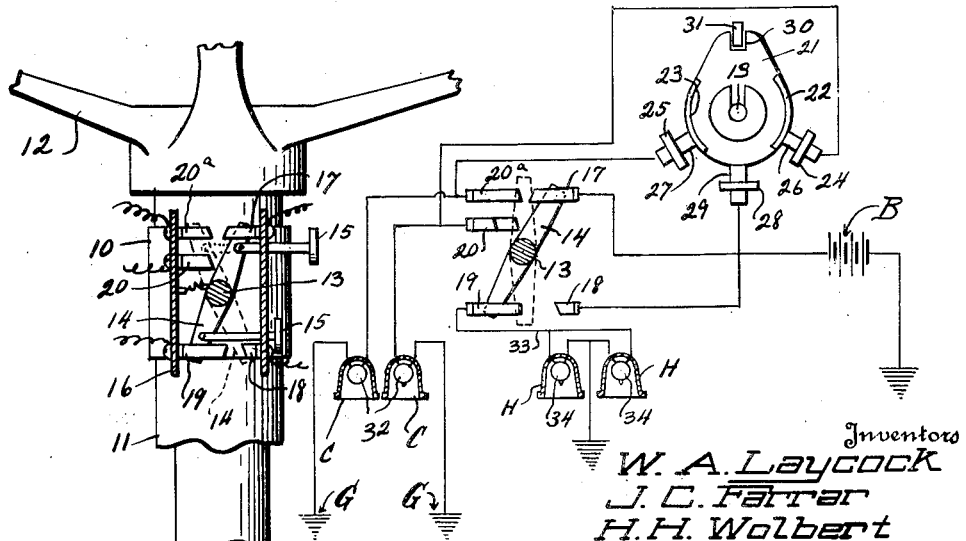

1,505,040

UNITED STATES PATENT OFFICE.

WILBUR A. LAYCOCK, JOHN C. FARRAR, AND HARRY H. WOLBERT, OF DELTA, COLORADO, ASSIGNORS TO MOTOR CURVE LIGHT COMPANY, OF DELTA, COLORADO, A CORPORATION OF COLORADO.

ROAD-ILLUMINATION CONTROL FOR VEHICLES.

Application filed January 6, 1923. Serial No. 611,055.

*To all whom it may concern:*

Be it known that we, WILBUR A. LAYCOCK, JOHN C. FARRAR, and HARRY H. WOLBERT, citizens of the United States, residing at Delta, in the county of Delta and State of Colorado, have invented certain new and useful Improvements in Road-Illumination Controls for Vehicles, of which the following is a specification, reference being had to the accompanying drawings.

This invention relates to road illumination control for vehicles and has for an important object thereof the provision of means whereby efficient illumination of the road upon which the vehicle is traveling may be had at all times.

A further object of the invention is to provide in combination with a vehicle having the usual headlights a pair of what is known as curve lights for directing light to the opposite sides of the road, together with means for automatically controlling the illumination of these lights so that upon turning movement of the vehicle to one side or the other, the curve light illuminating that particular side of the road toward which the turning movement is made is illuminated.

A still further object of the invention is to provide in combination with the combined lights as above set forth, means whereby the headlights may be extinguished and the curve lights simultaneously illuminated, these curve lights being directed downwardly in such a manner as to permit their use in passing an oncoming vehicle and to prevent the rays thereof from being directed into the eyes of the driver of such oncoming vehicle, such lights in such use replacing what is generally known as dimmer lights.

As is well known to those familiar with the operation of vehicles of the self-propelled type, the ordinary dimmer light is inefficient and at times dangerous. The light afforded by ordinary dimmer lights is so poor that the driver is unable to discern objects but a short distance ahead of his vehicle and accordingly when obliged to use the dimmer lights, as when passing another vehicle upon the road, is obliged to slacken his speed to a great extent, since otherwise objects hidden from his view in advance of the vehicle during the use of such dimmer lights will be overtaken and struck before the vehicle could be stopped. Ordinary headlights are disadvantageous for the reason that they are ordinarily focused upon the road at a distance considerably in advance of the vehicle and accordingly the light shed thereby immediately in advance of the vehicle is very dim and renders objects close to the vehicle difficult of discernment. For example, in driving into a garage at night along a path which is provided with side curbings and which is perhaps winding, the vehicle headlights cast the illumination so far in advance of the car that the operator of the car constantly strikes the curbing, injuring his tires and otherwise damaging his machine. Furthermore, in entering a narrow garage door, the light is focused upon the back of the garage, reflecting into the eyes of the driver and no illumination whatever is afforded immediately prior to entrance to the garage and during such entrance to the sides of the door which must be entered with the result that the fenders and wheels of the car and the doors of the garage are often damaged in making such entrance. It will, therefore, be obvious that lights which may be upon occasion substituted for the headlights and which are of considerable strength and illuminate the sides of the road in lieu of the center thereof are of considerable advantage in many instances. It is inadvisable that it be necessary for the operator of the vehicle in turning a corner to manually operate a switch to illuminate that side of the road toward which he is turning since such manual operation detracts his attention from the steering, important at this time, and furthermore engages in most instances the use of one hand. An important object of this invention is accordingly to provide automatic means for lighting the sides of the road during such turning movement, and means whereby light may be directed to the sides of the road alone, or to both the sides and central portion of the road, thus permitting the auxiliary lights to be employed not only as curve lights but as dimmers or in assistance to the driver when driving in close quarters.

These and other objects we attain by the construction and arrangement shown in the accompanying drawings wherein for the purpose of illustration is shown a preferred embodiment of our invention and wherein like reference characters designate like parts throughout.

In the drawings:—

Figure 1 is a diagrammatic plan view of an automobile provided with curve lights in accordance with our invention showing in solid lines the illumination of the road during a turning movement of the vehicle in one direction and in dotted lines the illumination of the road during a turning movement of the vehicle in the opposite direction;

Figure 2 is a similar view showing the illumination of the road when the curve lights are employed as dimmers;

Figure 3 is a side elevation showing the direction of the rays from the curve lights;

Figure 4 is a plan view partially in section of the switch employed showing the same in position upon the steering wheel;

Figure 5 is a side elevation thereof;

Figure 6 is a sectional view showing the details of the manually operated switch; and Figure 7 is a wiring diagram showing the connections employed.

Referring now more particularly to the drawings, V designates a vehicle having the usual headlights H and provided with curve lights C. The curve lights C are arranged at the sides of the vehicle at the front thereof so as to direct the rays thereof downwardly upon the road, as indicated in Figure 3, and toward opposite sides of the road, as indicated in Figures 1 and 2. The headlights H will focus upon the road in advance of the car at the point approximately indicated by the character F in the usual manner.

In accordance with our invention we provide in combination with head and curve lights directed as above set forth, a control switch 10 adapted to be arranged upon a stationary portion of the steering post, as indicated at 11, adjacent a moving portion 12 of the steering post moving in accordance with the movement of the steering wheel and preferably the steering wheel itself. The switch 10 embodies a pivot 13 having mounted thereon a blade 14 manually operated through medium of push buttons 15 to bring the ends thereof into engagement with contacts carried by the casing 16 in which the blade is mounted. At one side of the casing 16 are mounted contacts 17 and 18 adapted to be engaged by opposite ends of the blade 14 and at the opposite side of the casing are mounted contacts 19 and 20 and 20ª, the contact 19 being engaged by one end of the blade while the contacts 20 and 20ª are engaged by the opposite end of the blade. The construction of the contacts 17 to 20ª inclusive is preferably such that the blade 14 engages with the contacts 20 and 20ª prior to the disengagement thereof from the contacts 17 and 19 so that this blade may engage simultaneously with the contacts 17, 19, 20 and 20ª. The purpose of this construction will hereinafter appear.

The pivot 13 has likewise rotatably mounted thereon a flat disk 21 bearing a pair of contacts 22 and 23. Mounted upon the casing 16 are brush holding elements 24 and 25 having brushes 26 and 27 therein engaging the contacts 22 and 23 of the disk 21 respectively. Intermediate the brush holders 24 and 25 a third brush holder 28 is positioned having a brush 29 engaging the edge of the disk. That end of the disk next adjacent the moving part 12 of the steering post has formed therein a notch 30 in which engages an operating finger 31 rigidly secured to the moving part 12 so that the disk is oscillated upon oscillation of the steering wheel W. The contacts 22 and 23 are of sufficient length to bridge the distance between the brushes 26 and 27 when the steering wheel W is rotated through a sufficient angle, with the result that when the steering wheel is rotated in one direction the brushes 26 and 29 are electrically connected and when rotated a corresponding amount in the opposite direction the brushes 27 and 29 are electrically connected.

Each of the brushes 26 and 27 are electrically connected through one of the contacts 20, 20ª with the illuminating element 32 of the corresponding curve light C and through this curve light to the ground G. To the contact 19 a lead 33 is connected and this lead is connected through the illuminating elements 34 of the headlights with the ground. The battery B has one terminal thereof connected with the ground and the opposite terminal thereof electrically connected with the contacts 17 and 18 and the brush 29.

Assuming the blade 14 to be in the position shown in Figure 6 and the disk 21 in the position shown in Figure 4 if the steering wheel W be rotated in the direction of the arrow, this rotation causes, through the finger and notch engagement of the moving parts 12 and the disk, an oscillation of the disk to the dotted position illustrated with the result that the brushes 27 and 29 are electrically connected. If the turning movement represented by the arrow be such as to direct the vehicle toward the left, the right hand curve light C has the circuit of the illuminating element 32 thereof completed and accordingly the left hand side of the road is illuminated. If the rotation of the wheel W were in the opposite direction to that shown by the arrow, the brushes 26 and 29 would be electrically connected and the illuminating element of the opposite curve light actuated. At the same time it will be noted that the headlights H have the illuminating elements 34 thereof in a closed circuit and the headlights are accordingly in play. By depressing the proper button 15, the blade 14 may be shifted so as to electrically connect the contact 18 with the contacts 20 and 20ª completing the circuit from the battery to the contacts 20 and 20ª and from each of these contacts to one of the curve light illuminating elements 32 thereby positively lighting both of these lights and extinguishing the headlights with the result that light is cast upon both sides of the road and downwardly toward the road in such a manner that it will not interfere with the drivers of oncoming vehicles, thus permitting the curve lights to be used as dimmers and which function they perform more efficiently than dimmers for the reason that they provide a bright light thrown directly upon the ground and which is of sufficient strength to illuminate the ground in advance of the vehicle a considerable distance. If instead of moving the blade 14 to the dotted position shown in Figure 6 the movement of the blade is interrupted so as to leave the contacts 17, 19, 20 and 20ª all in engagement with the blade 14, then the circuit is completed from the battery to the blade 14 and from this blade to each of the curve lights through the contacts 20 and 20ª and to the headlights through the contact 19, current returning from the illuminating elements 32 and 34 to the battery through the ground. In this position the curve lights are accordingly brought into play simultaneously with the headlights with the result that not only are the sides of the road illuminated but that portion of the road lying directly in front of the vehicle is likewise illuminated. In turning a curve and simultaneously passing another vehicle, the switch 14 may be actuated, thereby not only dimming the headlights but illuminating the road in making such curve turn. This feature is important in that in turning a curve dim lights are extremely dangerous, having not sufficient strength to penetrate the darkness at the sides of the road and accordingly most drivers in turning a curve, regardless of whether they are passing another vehicle or no, will leave their bright lights on, thereby often temporarily blinding the other driver who is attempting to make the turn and who becoming confused during such temporary blindness either turns too far or does not turn enough with a result that machines are often wrecked.

From the foregoing it is believed to be obvious that the combination of headlight and curve lights together with a control mechanism such as set forth above is particularly desirable in that proper illumination of the road may be had at any and all times. Since the switch structure hereinbefore set forth is described and claimed in our co-pending application, Serial No. 611,056, filed January 6, 1923, for circuit makers and breakers, we do not herein claim such switch structure except in so far as it broadly enters into the combination of the head and curve lights in controlling the same. It will furthermore be understood that in the following claims the term curve light is understood to refer to a light for directing light to one side of the road.

We claim:—

1. In combination with a vehicle embodying forwardly directed headlights and a pair of curve lights directing light toward opposite sides of the road, means for illuminating the curve light directed toward either side of the road upon a turning movement of the vehicle toward that side of the road, and single means for simultaneously illuminating both of said curve lights.

2. In combination with a vehicle embodying forwardly directed headlights and a pair of curve lights directing light toward opposite sides of the road, automatic means for illuminating the curve light directed toward either side of the road upon a turning movement of the vehicle toward that side of the road, and manually operated single means for simultaneously illuminating both of said curve lights.

3. In combination with a vehicle embodying forwardly directed headlights and a pair of curve lights directing light toward opposite sides of the road, a control element therefor including an automatic switch for illuminating the curve light directed toward either side of the road upon a turning movement of the vehicle toward that side of the road, and a single manually operated switch for simultaneously extinguishing said headlights and illuminating both of said curve lights.

4. In combination with a vehicle embodying forwardly directed headlights and a pair of curve lights directing light toward opposite sides of the road, automatic means for illuminating the curve light directed toward either side of the road upon a turning movement of the vehicle toward that side of the road, and single manually operated means for simultaneously illuminating the headlights and both of said curve lights.

5. In combination with a vehicle embodying forwardly directed headlights and a pair of curve lights directing light toward opposite sides of the road, an open circuit for said headlights, an open circuit for each of said curve lights, and a switch common to said circuits, said circuits normally closing the headlight circuit and operable to open the headlight circuit and close said curve light circuit or to simultaneously close the circuits of both the head and curve lights.

6. In combination with a vehicle embodying forwardly directed headlights and a pair of curve lights directing light toward opposite sides of the road, an open circuit for said headlights, an open circuit for each of said curve lights, a switch for said circuits normally closing the headlight circuit and operable to open the headlight circuit and close said curve light circuit, said curve light circuit including parallel branches each of which is open when the curve light circuit is open, each of said branches including one of said curve lights, and automatic means for closing the branch of the curve light directed toward either side of the road upon a turning movement of the vehicle toward that side of the road.

7. In combination with a vehicle embodying forwardly directed headlights and a pair of curved lights directing light toward opposite sides of the road, automatic means for illuminating the curve light directed toward either side of the road upon a turning movement of the vehicle toward that side of the road, and single manually operated means for simultaneously illuminating both of said head or curve lights or both of said head and curve lights.

8. In combination with a vehicle embodying forwardly directed headlights and a pair of curve lights directing light toward opposite sides of the road, means for illuminating the curve light directed toward either side of the road upon a turning movement of the vehicle toward that side of the road, and single means for simultaneously extinguishing said headlights and illuminating both of said curve lights, or for illuminating said curve lights during the illumination of said headlights.

9. In combination with a vehicle embodying forwardly directed headlights and a pair of curve lights directing light toward opposite sides of the road, automatic means for illuminating the curve light directed toward either side of the road upon a turning movement of the vehicle toward that side of the road, and single manually operated means for simultaneously extinguishing said headlights and illuminating both of said curve lights or for illuminating said curve lights during the illumination of said headlights.

10. In combination with a vehicle embodying forwardly directed headlights and a pair of curve lights directing light toward opposite sides of the road, an open circuit for said headlights, an open circuit for each of said curve lights, and a switch for said circuits normally closing the headlight circuit and operable to open the headlight circuit and close said curve light circuit or to simultaneously close both of said circuits, and automatic means for closing the circuit of the curvelight directed toward either side of the road upon a turning movement of the vehicle toward that side of the road.

11. In combination with a vehicle embodying forwardly directed headlights and a pair of curve lights directing light toward opposite sides of the road, an open circuit for said headlights, a circuit for each of said curve lights including parallel branches each of which is open, and a switch for said circuit normally closing the headlight circuit and operable to open the headlight circuit and close one of the branches of each of said curve light circuits, and an automatic switch operated by a turning movement of the vehicle toward either side of the road for closing the other branch of that curvelight circuit the curvelight of which is directed toward the side of the road toward which the vehicle turns.

12. In combination with a vehicle embodying forwardly directed headlights and a pair of curve lights directing light toward opposite sides of the road, an open circuit for said headlights, a circuit for each of said curve lights including parallel branches each of which is open, and a control element for said circuits including a manually operated switch normally closing the headlight circuit and operable to open the headlight circuit and close one branch of each of the curve light circuits or to simultaneously close the headlight circuits and said branches of said curve light circuits, and an automatic switch for closing the other branch of the circuit of the curve light directed toward either side of the road upon a turning movement of the vehicle toward that side of the road.

13. In combination with a vehicle embodying forwardly directed headlights and a pair of curve lights directing light toward opposite sides of the road, an open circuit for said headlights, a circuit for each of said curve lights including parallel branches each of which is open, and a control element for said circuits including a manually operated switch normally closing the headlight circuit and operable to open the headlight circuit and close one branch of each of the curve light circuits or to simultaneously close the headlight circuits and said branches of said curve light circuits, and an automatic switch for closing the other branch of the circuit of the curve light directed toward either side of the road upon a turning movement of the vehicle toward that side of the road, said element being adapted for mounting upon the steering column of the vehicle whereby to render the manually operated switch convenient for operation by the operator of the vehicle and to permit operation of the automatic switch upon a turning movement of the steering wheel.

In testimony whereof we hereunto affix our signatures.

WILBUR A. LAYCOCK.
JOHN C. FARRAR.
HARRY H. WOLBERT.